United States Patent [19]
Vyncke et al.

[11] Patent Number: 5,926,185
[45] Date of Patent: Jul. 20, 1999

[54] METHOD FOR PROCESSING A SET OF PAGE DESCRIPTION LANGUAGE COMMANDS TO REDUCE COMPLEXITY

[75] Inventors: Frank Vyncke, Wilrijk; Patrick Bergmans, Gent, both of Belgium

[73] Assignee: Barco Graphics N.V., Belgium

[21] Appl. No.: 08/643,006

[22] Filed: May 3, 1996

[51] Int. Cl.$^6$ ............................................ G06T 5/00
[52] U.S. Cl. .................. 345/433; 707/517; 395/117
[58] Field of Search .................. 345/433, 434, 345/435, 441, 113, 114, 115, 116, 117, 118; 707/517, 523, 513; 395/103, 104, 109, 112, 114, 115, 117

[56] References Cited

U.S. PATENT DOCUMENTS

| | | | |
|---|---|---|---|
| 5,226,112 | 7/1993 | Mensing et al. | 395/114 |
| 5,307,452 | 4/1994 | Hahn et al. | 345/432 |
| 5,438,653 | 8/1995 | Boenke et al. | 345/431 |
| 5,542,052 | 7/1996 | Deutsch et al. | 345/431 |
| 5,600,768 | 2/1997 | Anderson | 345/435 |
| 5,608,848 | 3/1997 | Walker | 385/116 |
| 5,638,498 | 6/1997 | Tyler et al. | 395/117 |
| 5,659,638 | 8/1997 | Bengtson | 382/299 |
| 5,668,931 | 9/1997 | Dermer | 395/104 |
| 5,671,345 | 9/1997 | Lhotak | 345/433 |

*Primary Examiner*—Stephen S. Hong
*Attorney, Agent, or Firm*—Dov Rosenfeld

[57] ABSTRACT

A method for processing page description language commands improves the efficiency of the digital work flow in graphic arts. The method first translates the page description language commands into a structured object display list. The display list is then examined to identify the occurrence of specific predefined properties of graphical objects. The display list is modified to correct or eliminate the properties, and the corresponding page description language commands are modified accordingly. The specific predefined properties that are identified include spurious contours, double contours, redundant colors and inks, useless clips, tight continuous tone clips, blends, degenerate strokes, and strokes having unprintable thickness.

26 Claims, 16 Drawing Sheets

METHOD FOR PROCESSING A SET OF PAGE DESCRIPTION LANGUAGE COMMANDS TO REDUCE COMPLEXITY

FIELD OF THE INVENTION

The present invention relates to the field of digital processing of graphic arts. More specifically, it relates to methods for processing page description language commands representing graphical objects.

BACKGROUND OF THE INVENTION

Before the widespread use of computers by graphic artists, the traditional work flow in commercial printing involved digitally scanning a hard copy of the artist's original artwork, retouching or otherwise modifying the resulting pixel image, and printing it. Today, however, a commercial printer often receives from his customers digital art in the form of an electronic file, and such a file commonly contains commands written in a page description language (PDL) such as the Postscript®, developed by Adobe Systems, Inc. Typically, the customer or his artist uses a graphic design computer program to create and edit graphical objects which form elements of the artwork. Such design programs have internal formats for representing the graphical elements in the artwork. In order to electronically save, transmit, display, or print the artwork, such graphic design programs usually generate a PostScript or other common PDL file which contains commands representing the graphical objects. To view or print the artwork, the PDL commands are sent to a raster image processor (RIP) which interprets the PostScript commands and generates the specific signals which allow an output device to render the graphical objects. For example, the RIP may be part of a workstation and the output device may be a display screen. If a high quality or complex print is not required, a PostScript file might be printed by transmitting it to a laser printer which commonly contains a RIP for interpreting the PostScript and generating the appropriate signals for the printer to render a laser printed image. For high quality prints, or for printing very complex artwork, common laser printers are usually insufficient. In this case, the PostScript file is delivered to a commercial printer whose task is to make a high quality print of the art described in the PostScript file. His work also requires a PostScript interpreter and a RIP, but may involve various intermediate stages for preparing the artwork for printing. There is no way, however, of knowing in advance the complexity of such a file without first RIPing the file. Although the page (the "job") may be processed by RIPing the PostScript and preparing the resulting pixel image for printing just as if it were scanned from a hardcopy, this method has the disadvantage that the conversion to pixel images destroys the original structure of the graphical objects. Consequently, the objects are very difficult to isolate, scale, rotate, or otherwise modify.

It would be desirable to be able to edit the artwork file as a graphical object file rather than as a pixel image file. In order to obtain the same level of editability as was present in the native graphic design program, however, the commercial printer presently needs to have an entire array of such graphic design programs, including all their respective versions, as well as people skilled in using them and all the hardware required to run them. This solution is obviously expensive, awkward, and burdensome. There are many reasons why the commercial printer finds it necessary or desirable to edit or otherwise improve the PostScript files that are provided by his customers for printing. The first class of problems stems from constraints imposed by the printing process itself. For example, the printing process may not be able to render lines whose thicknesses are below a minimum threshold. Registration errors inherent in the printing process may create undesirable gaps between objects which touch but do not overlap each other, e.g., tight continuous tone clips. The printing process may also be limited by the number of available inks. Since these and other limitations may not be known or recognized by the graphic artist, who may be skilled in the art of design, but have limited knowledge of the printing process, the artwork may not print as intended.

Another class of problems is irrelevance and unnecessary complexity in the original PostScript file. When creating the artwork, the artist might lay numerous objects on top of each other during the design process. Consequently, the PostScript file may contain many unnecessary commands for creating objects that never appear in the rendered output. In addition to cluttering and lengthening the PostScript file, such hidden or masked objects slow down the PostScript interpretation process. Other types of irrelevant objects may also slow down interpretation and clutter the file. For example, a file may contain masks or clips that have no visible effect. Although some of these problems are created by the artists, many are generated by the native graphic design program when the PostScript file is generated. Because the design programs often represent graphical objects in a native file format which differs from PostScript, the graphical objects in the PostScript file are often corrupted or altered when they are converted from one format to the other. These corruptions often result in unnecessarily complex objects that complicate the PostScript file. For example, when the PostScript file is generated, a single object with two attributes may be split into two objects. Strokes may be converted to filled contours, and tints of the same color may be treated as independent colors. These and other complexities present in the PostScript file slow the interpretation of the PostScript file and make editing and printing the file difficult.

OBJECTS AND ADVANTAGES OF THE INVENTION

Accordingly, it is a primary object of the present invention to provide a method for improving the commands in a PDL file to simplify or optimize the digital work flow in graphic arts processing. Further objects of the present invention are to reduce the time required for interpreting and printing PDL files. It is an additional object of the present invention to simplify and correct PDL files. These and other objects and advantages will be apparent from the following description and figures.

SUMMARY OF THE INVENTION

The present invention achieves the above objects by a method of processing page description language (PDL) commands representing graphical objects. The method includes the step of translating the PDL commands into an object display list (ODL) which is a structured list containing mathematical descriptions of the graphical objects and their properties. The method further includes the step of identifying graphical objects in the ODL which have certain predefined properties that may be undesirable. For example, a preferred embodiment of the invention identifies completely hidden objects, contours with nonprintable thicknesses, tight continuous tone clips, double contours, useless clips and degenerate strokes. After such graphical objects are identified in the ODL, the PDL commands corresponding to the graphical objects are modified so that the property is no longer present. For example, in a preferred embodiment this modification may include the removal of hidden objects and useless clips, thereby simplifying the PDL file. In a preferred embodiment the modification may also include adjusting the thickness of contours so that they are printable, adjusting continuous tone clips and regenerating strokes, thereby improving the PDL file. A preferred embodiment of the invention also includes color mapping and ink reduction which improve the PDL file by reducing the required number of basic colors and inks, respectively. A preferred embodiment also includes identifying corresponding objects in different color separations and merging these objects to create an integrated PDL file. These and other features of the invention, therefore, provide a method for simplifying and optimizing a set of PDL commands.

DETAILED DESCRIPTION

In a preferred embodiment of the invention, the method is implemented as a program running on a computer workstation, for example a Barco Graphics model BG-2200L, BG-2300L, BG-2400L, BG-2400LC, BG-25x0L or BG-25x0LC workstation produced by the assignee of the present invention. In a preferred embodiment, the program is used to optimize imported or existing PostScript files both for editability and exposability. Some of the optimizations are automatic once the user has configured the program for a target printing process. Other optimizations may be changed depending on the requirements for a particular job.

Figure 1:
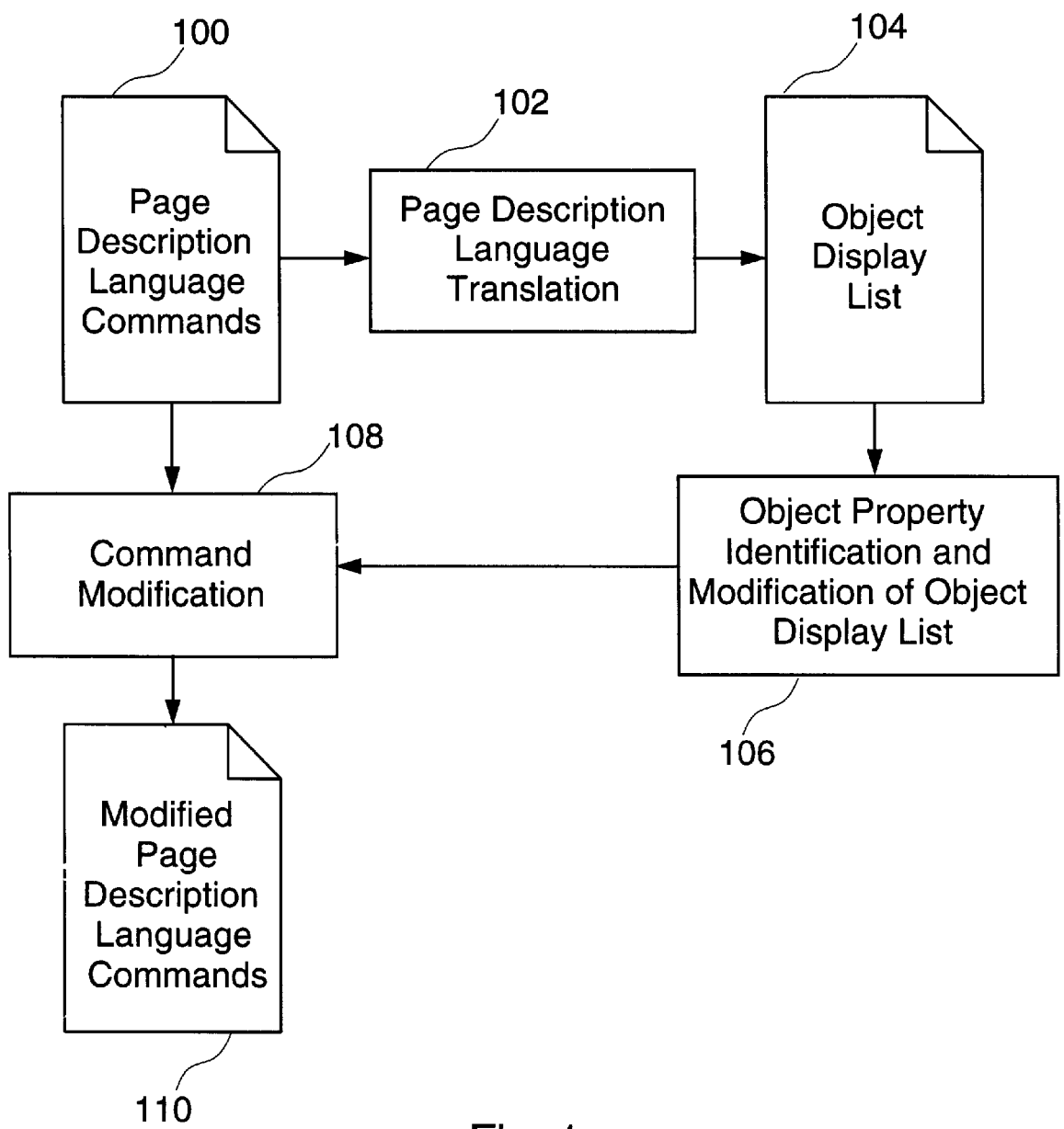
FIG. 1 is a flow chart of the general process by which PDL commands are modified according to the present invention.

In general terms illustrated in FIG. 1, a PDL translation step 102 of the method interprets the PostScript commands 100 and builds a structured object display list (ODL) 104, or database, of graphical objects. A second step 106 identifies specific predefined properties of objects in the object display list that are identified for optimization and modifies the objects in the list based on identified properties of graphical objects. In a command modification step 108, modified PostScript commands 110 corresponding to the modified list may then be produced as an optimized set of PostScript commands. Alternatively, other representations may be output, or the job can be directly output or printed.

The PostScript PDL file contains a sequential list of commands which, when interpreted, generate graphical objects such as vectors, splines, text, and continuous tones (CTs). The PostScript language provides for describing the properties of objects such as position, color and size, as well as the relationship between objects to provide for grouping of objects and placement of one object over another. The implementation of the method of the present invention interprets these PostScript commands and generates an object display list (ODL) of graphical objects. The resulting database consists of a list of exactly those objects that the PostScript commands generated. These graphical objects can be, for example, of a line art type, a contour, a line art pixel, or a text object. In addition, these objects can be grouped, so they behave together as a single object. In a preferred embodiment, the format used for the object display list is GRO™ (GRaphics Objects), the native internal format used by Barco Graphics, the assignee of the present invention. Like PostScript, GRO is device and resolution independent, object oriented, stores text as text, and uses the path construct to represent line art. Unlike PostScript, however, the GRO format is not a programming language but a structured list containing mathematical descriptions of the graphical objects. It supports all the object representation features of PostScript but also provides additional features beyond those contained in PostScript. GRO also differs from PostScript in that GRO is a binary format, while PostScript is an ASCII format. GRO files are therefore inherently compact. Moreover, the GRO format allows editability of PostScript files while faithfully preserving the integrity of the graphical objects as they were originally created in their native format.

Although GRO is used in the preferred embodiment, it will be clear to those in the art that other formats can be used without deviating from the scope of this invention.

Once the ODL is created, the invention analyzes it and identifies undesirable features such as irrelevant objects, degenerated objects, redundant objects, and independent colors that are actually tints of the same color. Based in part on user-defined settings, the preferred embodiment then modifies the ODL either automatically or with user intervention to produce an optimized ODL. In the preferred embodiment the original PostScript commands are modified to reflect the corresponding changes in the ODL, thereby generating an optimized PostScript file. Alternatively, the modified ODL may be used to directly generate an image.

The following description details particular properties of graphical objects that are identified by the preferred embodiment and the appropriate modifications to the objects that result in file optimization.

Remove Spurious Contours

Contours that do not generate any output are called spurious contours. Because they uselessly clutter the Post- Script file, it is desirable to identify and remove such objects. Often spurious contours are made by mistake or made for measuring purposes inside certain PostScript printer drivers. An object whose outline contains only one point, which has no stroke attribute and which is not a mask is considered a spurious contour. An object whose outline has at most two points, which has not fill or stroke attribute, and which is not a mask is also considered a spurious contour. Another example of a spurious contour is an object which is a mask but has no other object linked to it.

Figure 2:
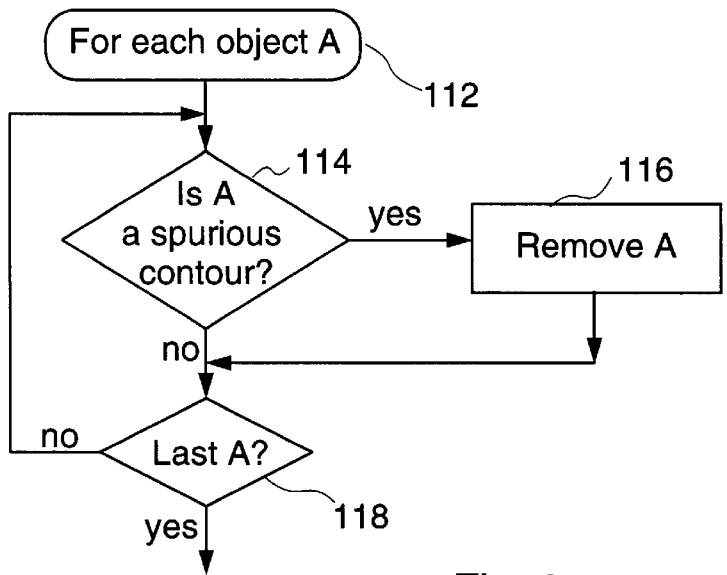
FIG. 2 is a flow chart of the procedure for removing spurious contours.

FIG. 2 is a flow chart indicating the procedure for identifying and removing spurious contours. A loop initialization step (block 112) prepares to iterate through each object A in the display list. If object A is a spurious contour (block 114), the object is removed from the list (block 116). The PostScript command file is also modified accordingly. If A is not the last object in the list (block 118), then A is set to the next object and control is passed back up to block 114. Otherwise, the procedure is complete.

Remove Double Contours

Figure 3:
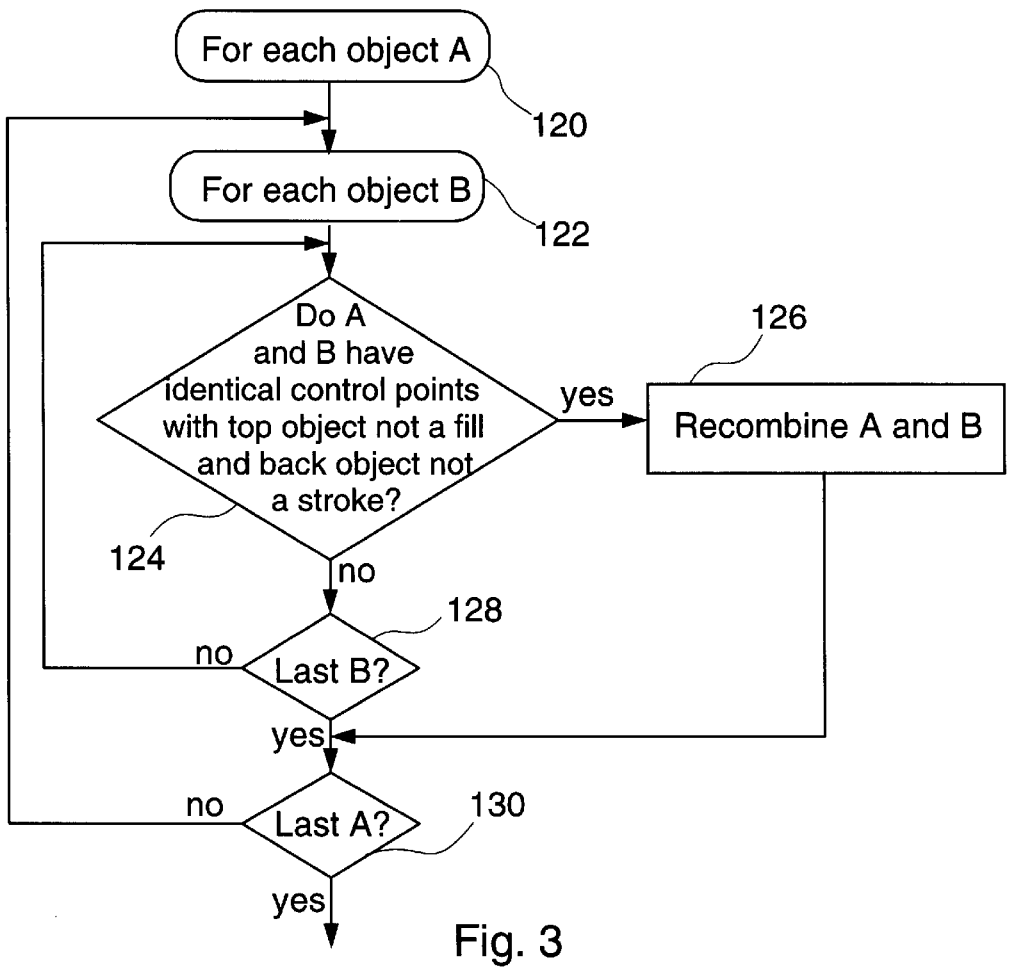
FIG. 3 is a flow chart of the procedure for removing double contours.

Objects with multiple attributes like a fill and a stroke are represented as one object in most graphic art editors, but during PostScript export they get broken into multiple objects, one for the fill and one for the stroke. By merging the two objects together to create a single object with multiple attributes, the file is optimized and editability is improved. FIG. 3 shows how the preferred embodiment identifies such multiple attribute objects. Loop initialization blocks 120 and 122 set up an iteration through pairs of objects A and B. The program checks (block 124) if the pair has one object in front of the other with identical control points, i.e., the same number of control points in exactly the same locations. Moreover, the top object must be a stroke and not a fill, while the back object must not be a stroke. If it finds such a pair of objects, the preferred embodiment then modifies the database and PostScript file to recombine the two objects into one (block 126). To merge the two objects, the stroke is transferred to the back object and the top stroked object is deleted. In case the lower object is not stroked and the upper object is filled with a solid paint style, the lower object is deleted. Blocks 128 and 130 return control back through the loop until all pairs have been tested.

Color Mapping

PostScript files usually describe objects with color. As the PostScript commands are interpreted, a color database is created in addition to the object database. The color database contains, like a palette, all the colors used in the file. This palette, however, does not contain any relationships between colors. For example, a color and 50% of the same color, i.e., a tint, are listed as distinct unrelated colors. This redundancy results in unnecessary clutter in the PostScript file. In order to reduce this redundancy, the preferred embodiment analyzes the complete color palette for possible relationships between the colors and eliminates redundancies.

Figure 4:
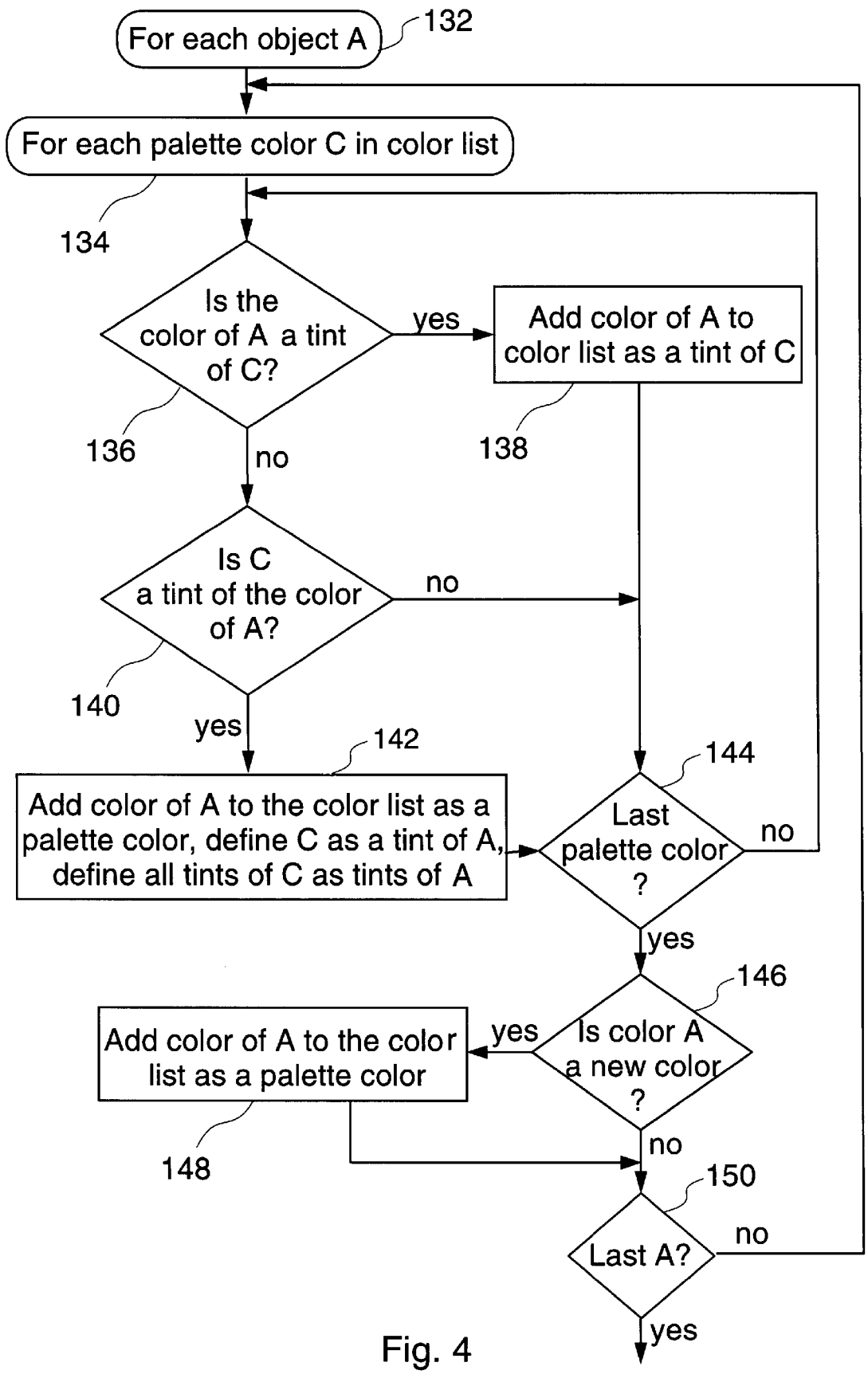
FIG. 4 is a flow chart of the first part of the color mapping procedure which finds tint correspondences.

FIG. 4 shows the first part of the color mapping process: finding tint correspondences between colors. Block 132 initializes a loop through each object A in the object list, and block 134 initializes a loop through each color C in a color list. Block 136 checks if the color of A is a tint of C. If so, the program adds the color of A to the color list as a tint of C (block 138). Alternatively, it checks if C is a tint of the color of A (block 140). If so, the program adds the color of A to the color list as a palette color, defines C as a tint of A, and redefines all tints of C as tints of A (block 142). Color C and the color of A are considered tints of the same color if their components are within 0.5% of each other even though they may have possibly different tints. Other thresholds may be used without deviating from the scope of this invention. The color requiring the lowest percentages of inks is defined to be a tint of the other color. If the palette color is redefined as a tint of the object color (which becomes a new palette color) then all colors previously defined as tints of the palette color are redefined as tints of the new palette color. This procedure is repeated for all the palette colors (block 144). If, after checking all palette colors, no tint relation is found between the object and any existing palette color, then the object color is new (block 146) and it is added to the palette (block 148). By repeating this process for all objects A (block 150), a palette of basic colors is created that has no tint redundancies in it. If the user changes any color in the palette, all the derived tints are then automatically updated relative to the change.

A slightly different kind of color mapping can be applied to blends to further reduce the palette size. (Blends are discussed in more detail below in relation to FIG. 10.) For example, if blends are created between two colors, the intermediate colors are defined as separate colors that gradually vary from one of the extreme colors to the other. These intermediate colors are not tints of one color but mixtures that can be derived by interpolation between the extreme colors. Intermediate colors in a blend can be identified because if objects are part of a blend they will be consecutive objects in the database between the two extreme colors. Although the intermediate colors are not tints of one or the other extreme color, each intermediate color can be defined as a combination of the two extreme colors.

Figure 5:
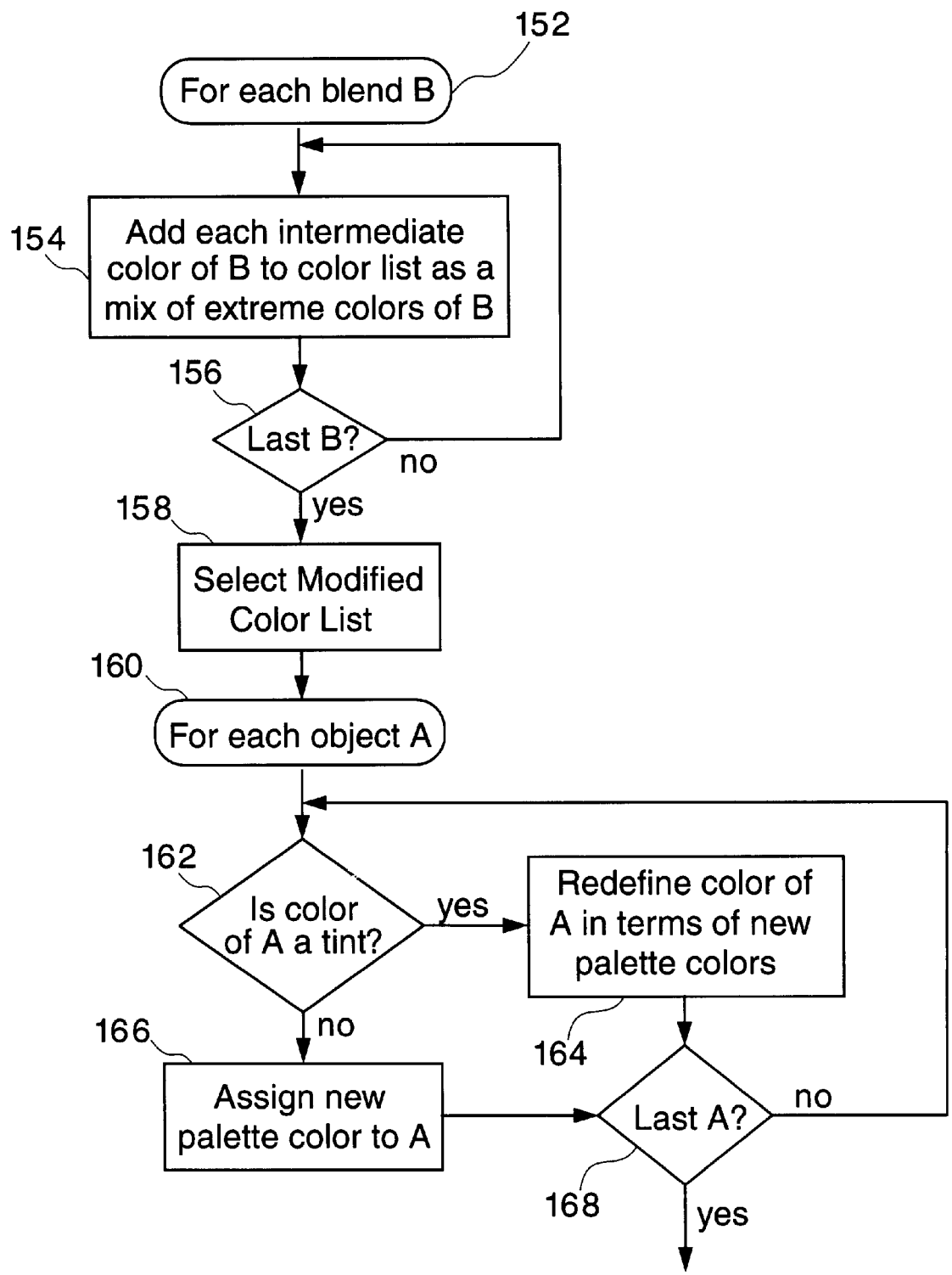
FIG. 5 is a flow chart of the second part of the color mapping procedure which finds blend color mixtures.

FIG. 5 shows the second part of the color mapping process: finding intermediate colors of blends. Blocks 152 and 156 control a loop through all blends. For each blend, each of the intermediate colors is defined in the color list as a mixture of the extreme colors of the blend (block 154). After this is performed for all blends in the display list, the color mapping process allows user modification of the color list (block 158). It then loops through all the objects A in the display list (blocks 160 and 168) and, depending on whether the color of A is defined as a tint or not (block 162), redefines the color of A in terms of the new palette colors (block 164) or assigns a new palette color to A (block 166), respectively.

Ink Reduction

For purposes of printing, each color in a job must be expressed as a combination of inks. During the creative process of graphic design, the designer is usually not focused on the printing issues of the design and will use colors and color definitions without concern for the number of inks that may be required as a result. Consequently, the resulting PostScript file will call for the use of a large number of inks. Since it can be very expensive to print a job requiring a large number of inks, however, it is very desirable to reduce the number of inks in the ink list.

Figure 6:
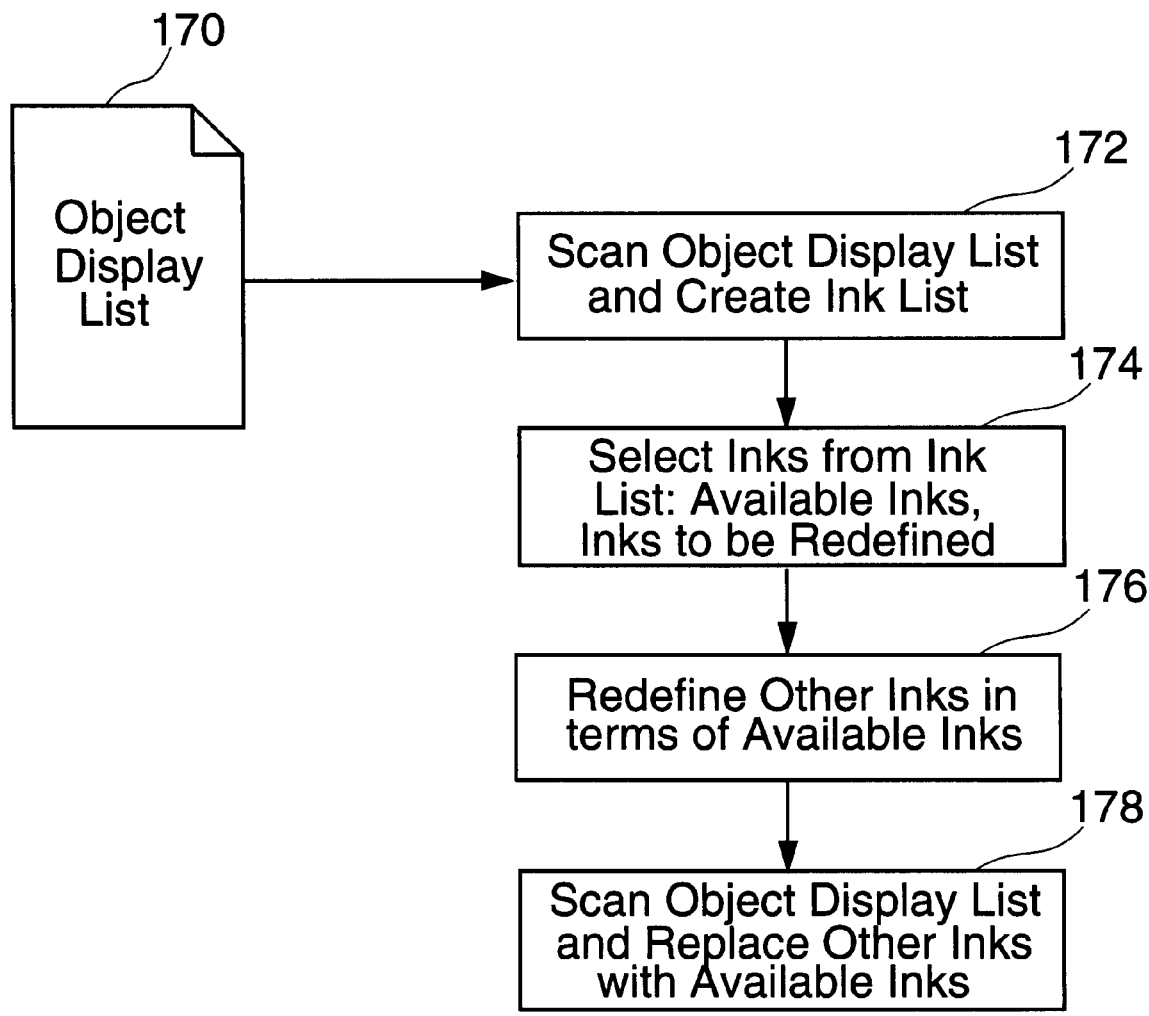
FIG. 6 is a flow chart of the procedure for ink reduction.

The present method for reducing the number of inks is shown in FIG. 6. A complete ink list for the job is created by scanning the object display list 170 and, for each object, adding to the ink list any new ink that is used to create the color of the object, together with its associated screening parameters (block 172). Once the ink list is created, a list of available inks is selected from the ink list (block 174). Inks are then eliminated by expressing them in terms of available inks (block 176), thereby optimizing the ink list. Typically, the user selects from the ink list the specific inks available for printing a given file, the inks to be eliminated by redefinition in terms of available inks, and the spot inks to be eliminated by redefinition in terms of a close color created with CMYK inks. A color management system then redefines other inks in terms of combinations of the available inks (block 178). Color management systems, such as Colorsync™ by Apple Computer, Inc., are well known in the art. The color management system also controls relevant screen angle, line frequency, or screen frequency parameters in the conversion. The "Ink Reduction" feature can selectively convert colors containing special or spot inks, such as Pantone® inks to colors containing cyan, magenta, yellow, and black (CMYK) inks, and map several lineatures of the same ink to one. When all inks have been redefined in the ink list, the object display list is scanned and any modified inks in the color definition of each object are replaced with the corresponding available inks.

For example, Table 1 below shows in the left column the initial ink list and in the right column the modified ink list, where C, M, Y, K, P1, and P2 represent Cyan, Magenta, Yellow, Black and spot inks 1 and 2, respectively, and lpi is lines per inch, the half tone screen frequency.

TABLE 1

Ink Reduction

| Original Inks | Modified Inks |
| --- | --- |
| C 100 lpi | C 100 lpi |
| M 100 lpi | M 100 lpi |
| Y 100 lpi | Y 100 lpi |
| K 100 lpi | K 100 lpi |
| C 100 lpi 68%, M 100 lpi 100% | C 100 lpi 68%, M 100 lpi 100% |
| C 120 lpi | C 100 lpi |
| P1 100 lpi | P1 100 lpi |
| P1 120 lpi | P1 100 lpi |
| P2 100 lpi | C 100 lpi, Y 100 lpi 80% |
| P2 100 lpi 50% | C 100 lpi 50%, Y 100 lpi 40% |

The first five inks in the example remain unchanged, as does the first process ink at 100 lpi. The C 120 lpi ink is replaced by the C 100 lpi ink and the P1 120 lpi ink is replaced by the P1 100 lpi ink. The P2 100 lpi ink is redefined in terms of CMYK inks, and the P2 100 lpi 50% ink is therefore redefined in terms of corresponding CMYK inks as well. In this manner, the total number of inks required to print the artwork is reduced.

Useless Clips, Gross Clipping and Hidden Objects

Useless objects often arise as a result of clipping objects, e.g., those clipping parts automatically inserted by PostScript printer drivers with the intention to mask visible objects to within a region. For example, certain clipping objects may be present in the file even though they do not actually clip any other object. In this case, the clipping object is useless and can be deleted. At the other extreme, a clipping part may clip away another object completely, in which case the other object may be deleted. Similarly, any object that is completely hidden by an opaque, or solid, object may also be deleted.

Figure 7A:
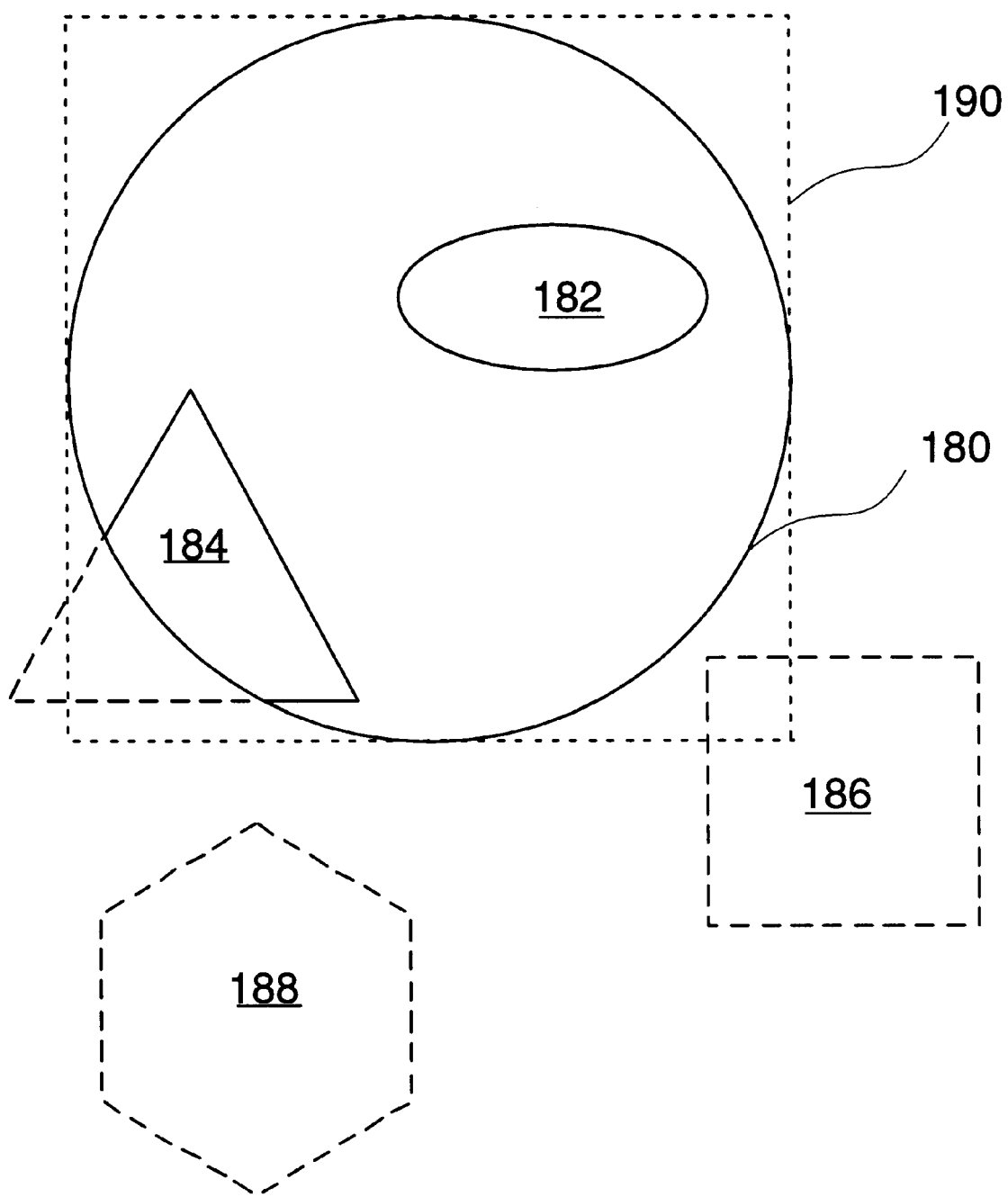
FIG. 7a is a picture illustrating clipping of graphical objects.

FIG. 7a shows a circular mask 180 grouped with four objects. An oval 182 is not masked at all, a triangle 184 is partly masked, and a square 186 and hexagon 188 are completely masked. Because both the square and hexagon are completely masked, they may be deleted. The preferred embodiment, however, is optimized to delete only the hexagon because the square overlaps the bounding box 190 of the circular mask and it is more complicated to check whether or not it is actually masked. A procedure for identifying and deleting such masked objects comprises scanning the object list for masks and checking whether each object in its group falls completely outside the bounding box of the mask, i.e., the smallest rectangular region containing the contour defining the edge of the mask. If so, the object is deleted. Note that the actual visible bounding box of an object depends on whether or not it has a stroke attribute and whether or not it is clipped.

Figure 7B:
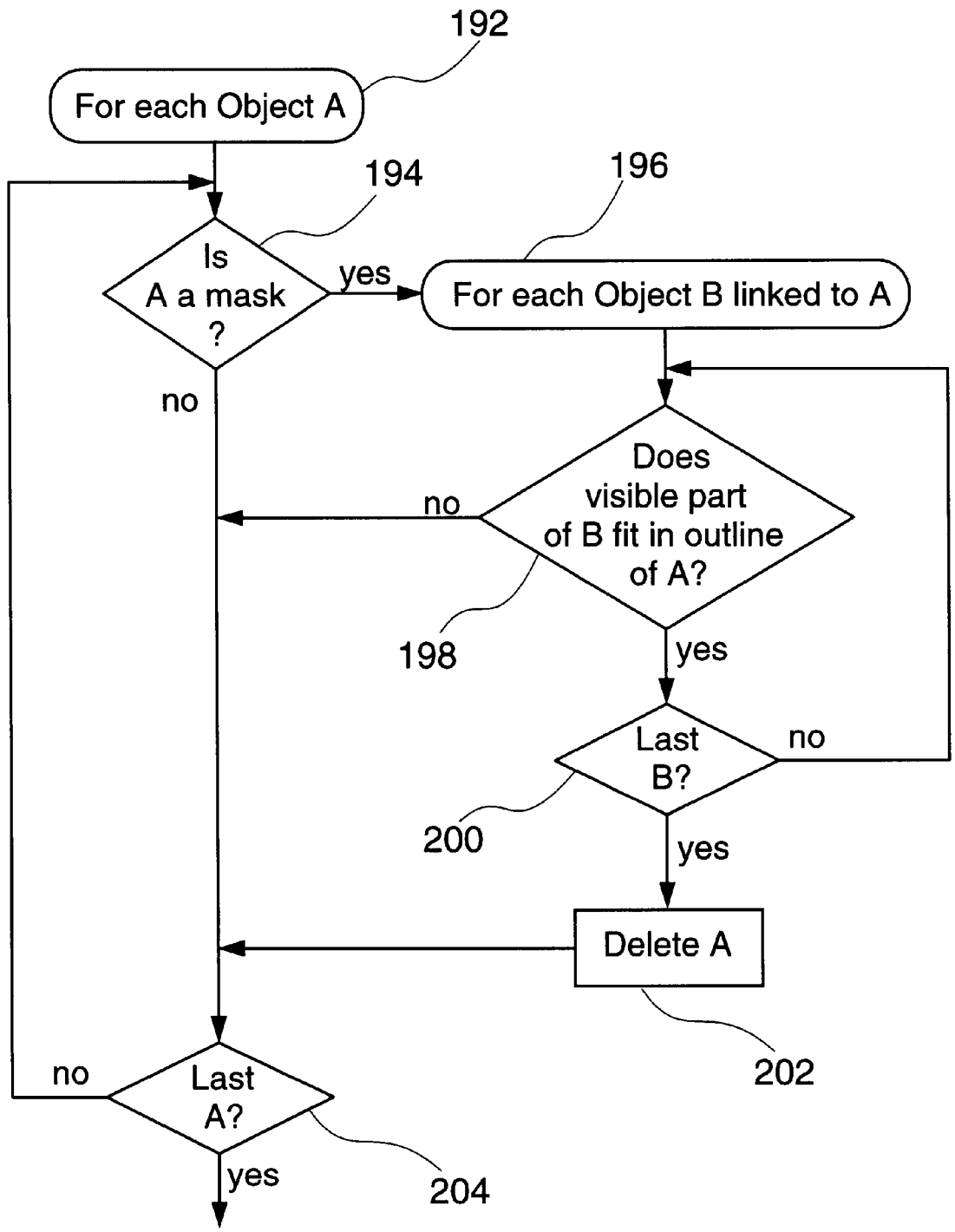
FIG. 7b is a flow chart of the procedure for removing useless clips.

If FIG. 7a contained only the oval 182 and the circular mask 180, then the mask would be useless because it would clip no object. In that case, the clip could be deleted. Useless clipping parts, or masks, can be identified for deletion as shown in FIG. 7b. Blocks 192 and 204 control a loop through all objects A. If an object A is a mask (block 194), then a visibility check is performed to test whether or not it is useless. The preferred embodiment performs this check by looping (blocks 196 and 200) through all objects B linked to mask A, i.e., those objects which are clipped by the mask. If the visible part of B lies completely within the outline of the mask A (block 198), the object will not be altered by the mask. If this condition holds for all such objects grouped with the mask, removal of the mask will not change the appearance of the design, so the clipping part is deleted from the database (block 202). Otherwise, the mask is not useless so control is passed on to check the next object A.

Figure 8A:
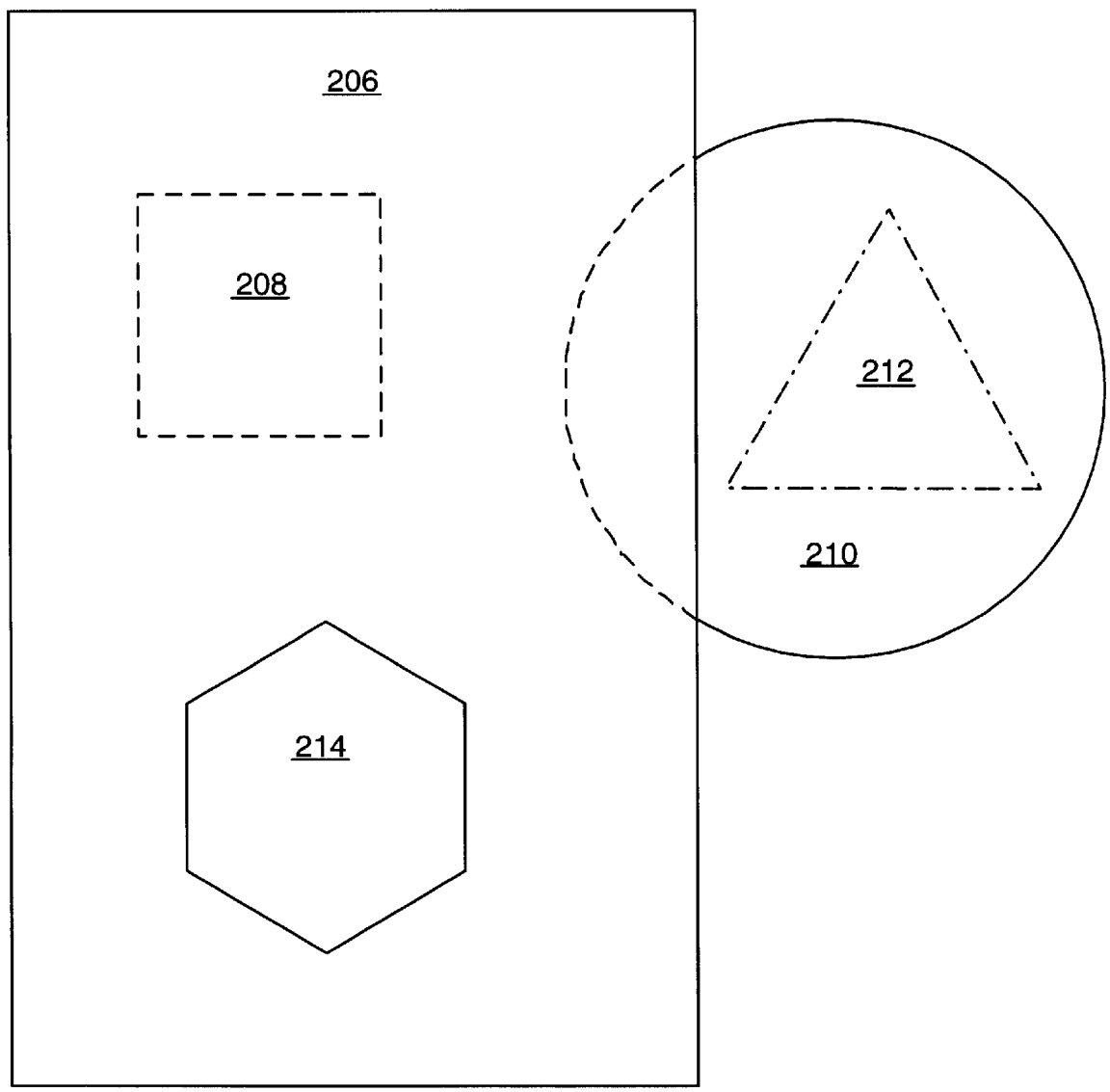
FIG. 8a is a picture illustrating hidden graphical objects.

Certain objects hide other objects. For example, sometimes a designer will cover unwanted existing objects in a job instead of deleting them. This can also happen for jobs with master pages: all components of the master page that are unwanted on a certain page are covered because they cannot be removed from a single page. This results in a severe overload of objects on a page and in longer processing times. FIG. 8a shows an example of a rectangle 206 which completely covers a square 208 and partly covers a circle 210. Although the circle completely covers a triangle 212, the circle is not opaque (solid), so the triangle is not actually hidden but shows through. A hexagon 214 is contained within the bounds of the rectangle, but it is on top of the rectangle and is not hidden.

Figure 8B:
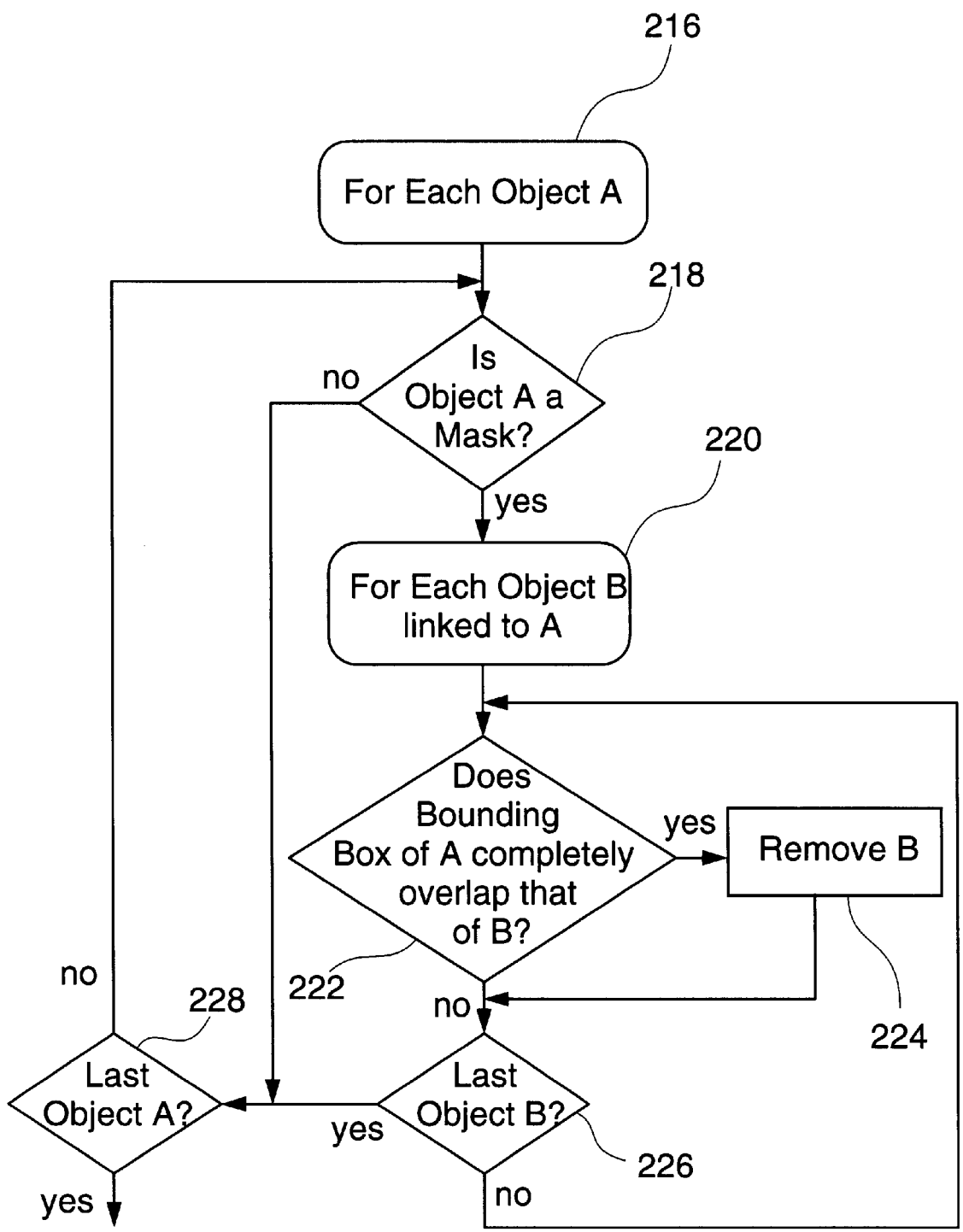
FIG. 8b is a flow chart of the procedure for removing masked or hidden objects.

FIG. 8b shows the procedure for identifying and eliminating hidden objects. The method loops through all masking objects A (blocks 216, 218 and 228). Such opaque or masking objects have a fill attribute that fully masks the background without any translucency or transparency. Although it is not necessary, to ensure quick operation the preferred embodiment only checks those objects A which are rectangular and have a surface area of at least 150 square mm. For each such A, the program then loops through all objects B that are linked to A (blocks 220 and 226). If the bounding box of A completely covers that of B (block 222) then B is removed from the list (block 224). The condition of being fully covered is determined by comparing the bounding boxes of the two objects and determining which object is on top of the other. This procedure applied to the image shown in FIG. 8a will delete only the square.

Continuous Tone (CT) Clips

When working with continuous tone (CT) objects, various undesired printing errors can result from so-called "tight" CT clips. If, for example, a black overprint stroke attribute is drawn around the border of a CT image, some printer drivers will clip the CT image to the edge of the stroke. Often one desires the CT image to stay underneath the stroke so that registration errors do not result in the appearance of white gaps between the CT and the stroke. Manually eliminating these tight clips can be very laborious. The outline of the mask must lie inside the outline of the stroke. So one must select the stroked object, create the outline of the stroke that is applied to the object, and check if the outline of the mask lies inside the created outline.

Figure 9:
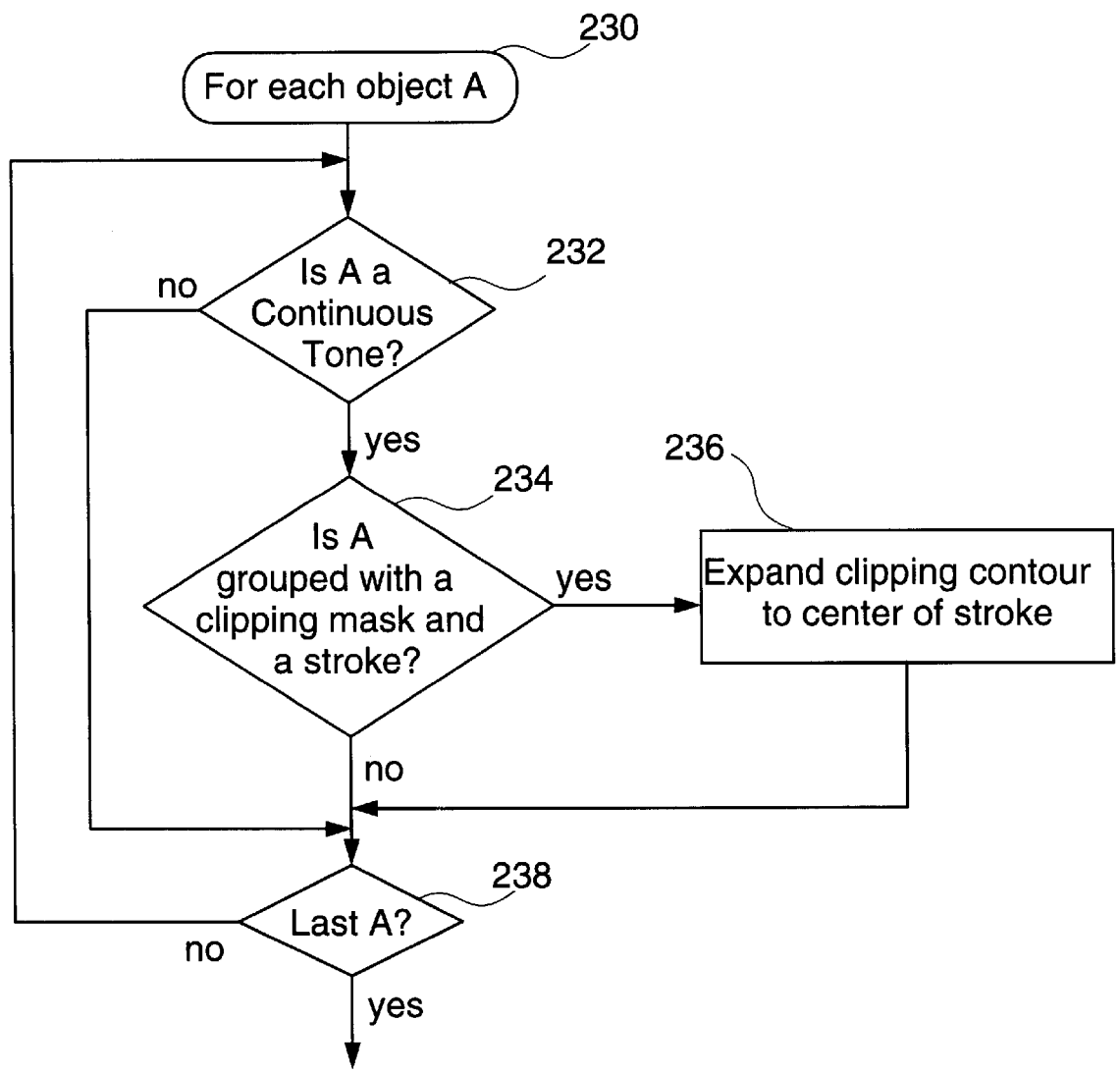
FIG. 9 is a flow chart of the procedure for eliminating tight CT clips.

A method for addressing this problem is shown in FIG. 9. The preferred embodiment loops through all CT objects A (blocks 230, 232 and 238). For each such A, it checks for grouping with a mask and a stroke on top of it (block 234). If this condition is met, it will expand the clipping contour so that the border of the CT is positioned at the center of the stroke (block 236), i.e., so that half of the stroke covers the CT image and half extends out from its border.

Convert Blends to CTs

Figure 10A:
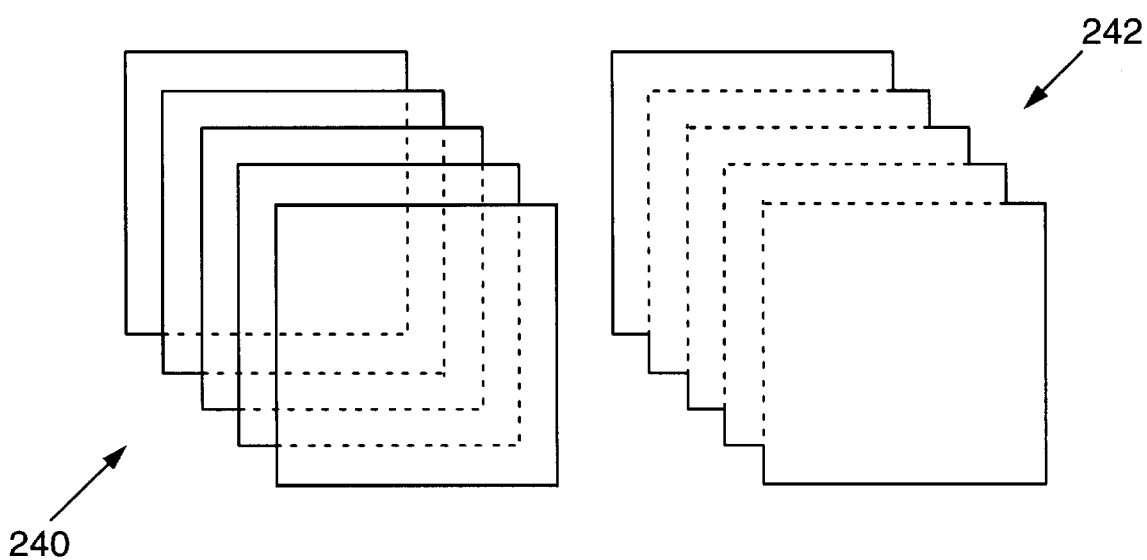
FIG. 10a is a picture illustrating a blend and its corresponding continuous tone.

Designs with blends often contain so many contours that the printing process is heavily burdened. In many cases, however, the contours in blends are not necessary and can be replaced with CTs. For example, a blend of two hundred or more colors can be replaced with one object, a CT, thus making manipulation of the file much easier. The conversion to a CT also has the advantage that the discrete color transition of the blend can be replaced by a continuous transition through the use of noise or interpolation methods. FIG. 10a shows an example of a simple blend of five squares 240 that are close in position and color. They are replaced by a single continuous tone image 242 having the same outline as the blend. If adjacent squares in the sequence were not close in color or were not at least touching each other, then they would not represent a blend and would not be converted to a CT object.

Figure 10B:
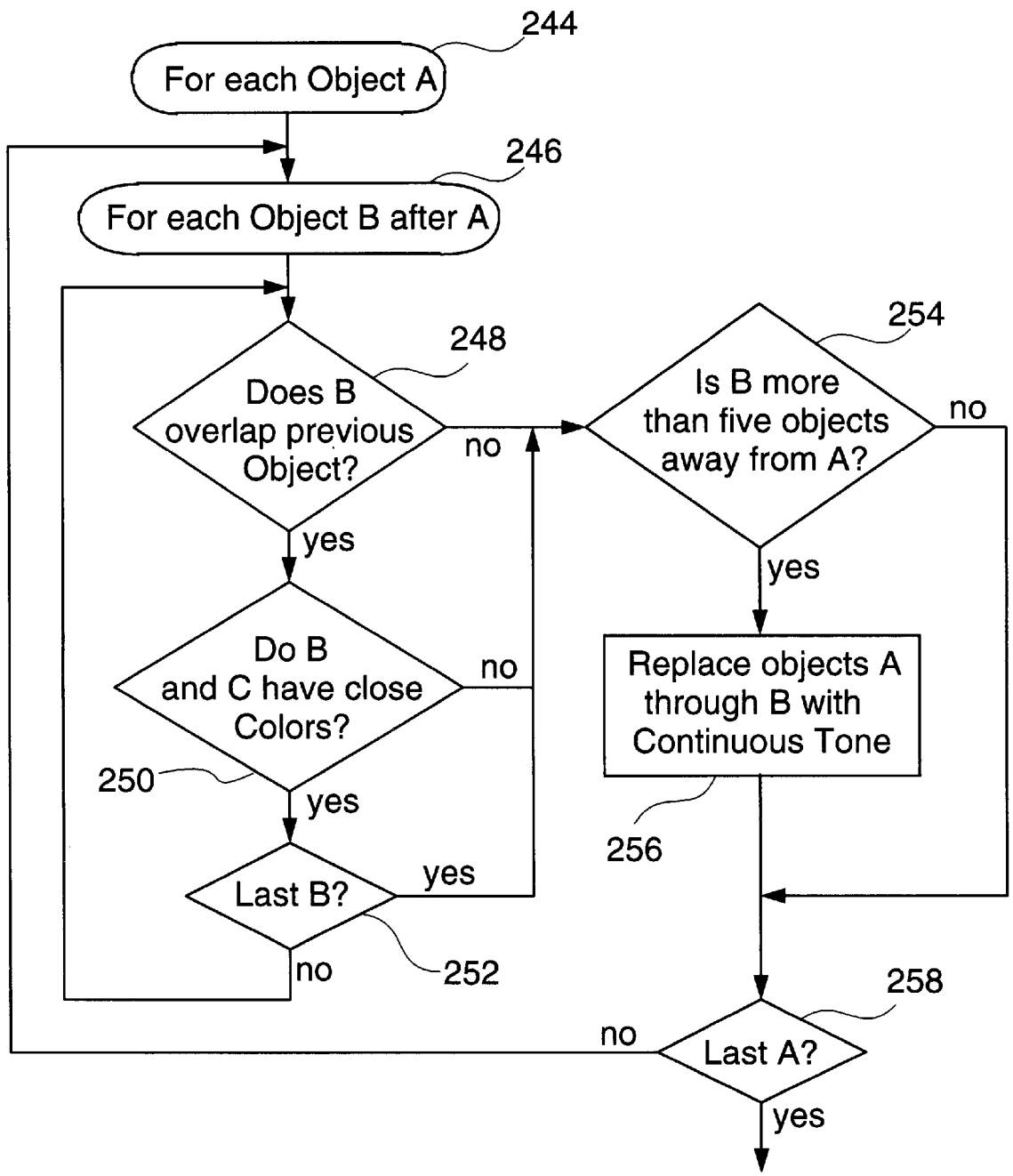
FIG. 10b is a flow chart of the procedure for converting blends to continuous tones.

A method for replacing blends with CTs is shown in FIG. 10b. Blends are identified by scanning the database for a sequence of at least five objects, each of which is close in color and position to its adjacent objects, meaning that their bounding boxes at least touch each other and that any of the ink components of their colors do not differ by more than a predefined value, typically 2% to 3%. As would be clear to those in the art, other values may be used without deviating from the scope of this invention. In addition, in the preferred embodiment, the objects in the sequence must be all opaque (solid) or all transparent. Once a blend is identified, its outline is used as a clipping mask for a CT. The color transition of the blend is then rendered to a single CT object, and the blend is replaced by the CT with its mask. When scanning to identify blends, the preferred embodiment ignores the grouping of objects since the objects of the blend often are created as parts of different object groups. The method is performed by looping through all objects A (blocks 244 and 258). For each object A, the program loops (blocks 248 and 252) through each object B that comes after A in the object list until either B does not overlap the previous object C in the list (block 248), B and the previous object C do not have close colors (block 250), or all objects B have been checked (block 252). Once one of these conditions is satisfied, the program checks if B is more than five objects away from A (block 254). If so, then it replaces objects A through B with a CT object (block 256) and continues the loop through objects A (block 258).

Modify Stroke Thickness

Figure 11:
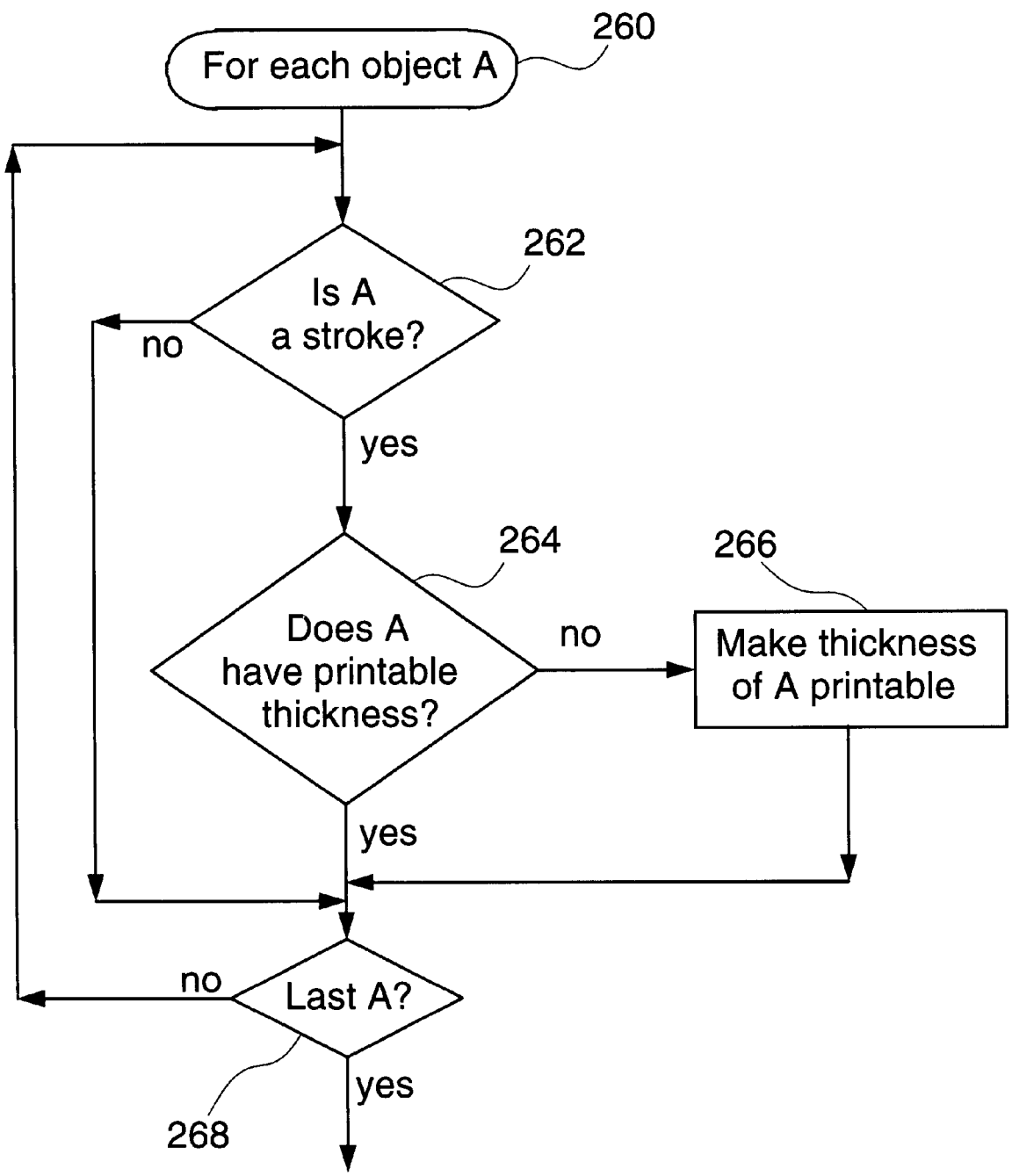
FIG. 11 is a flow chart of the procedure for modifying stroke thicknesses.

Sometimes strokes are created which do not print (the hairline problem), for example, strokes that are too thin. Because it is a laborious task to manually identify and thicken all such strokes, the preferred embodiment automatically scans the database for all strokes having a thickness attribute below a predefined nonprintable thickness and increases the thickness attribute of such strokes so that they are printable, as illustrated in FIG. 11. Alternatively, all stroke thicknesses can be scaled a certain amount proportionately, or all changed by a fixed amount.

The method loops through all objects A that are strokes (blocks 260, 262 and 268). For each such A, it checks if A has a printable thickness (block 264). If not, then it adjusts the thickness to make it printable (block 266) and continues on to the next object (block 268).

Stroke Regeneration

There is another type of object that is problematic. It sometimes happens that certain stroke-like objects in the database do not appear under preview or when the file is raster image processed (RIPed). For example, some objects have no surface, which means that the contour is built out of commands like <"move to," "line to," "finish">, or <"move to," "line to," "line to," finish">, where the last "line to" draws a line to the same point as the "move to". When a fill is applied to such an object, it will generate an object in the database which may not appear when processed by the printing system. To address this problem the preferred embodiment identifies such strokes and regenerates them so that they are printable as intended. For example, an object that has a <"move to," "line to"> to a different point and has a fill attribute only is simply converted to <"move to," "line to"> with no fill and with a stroke attribute having the same color as the old fill attribute.

Figure 12A:
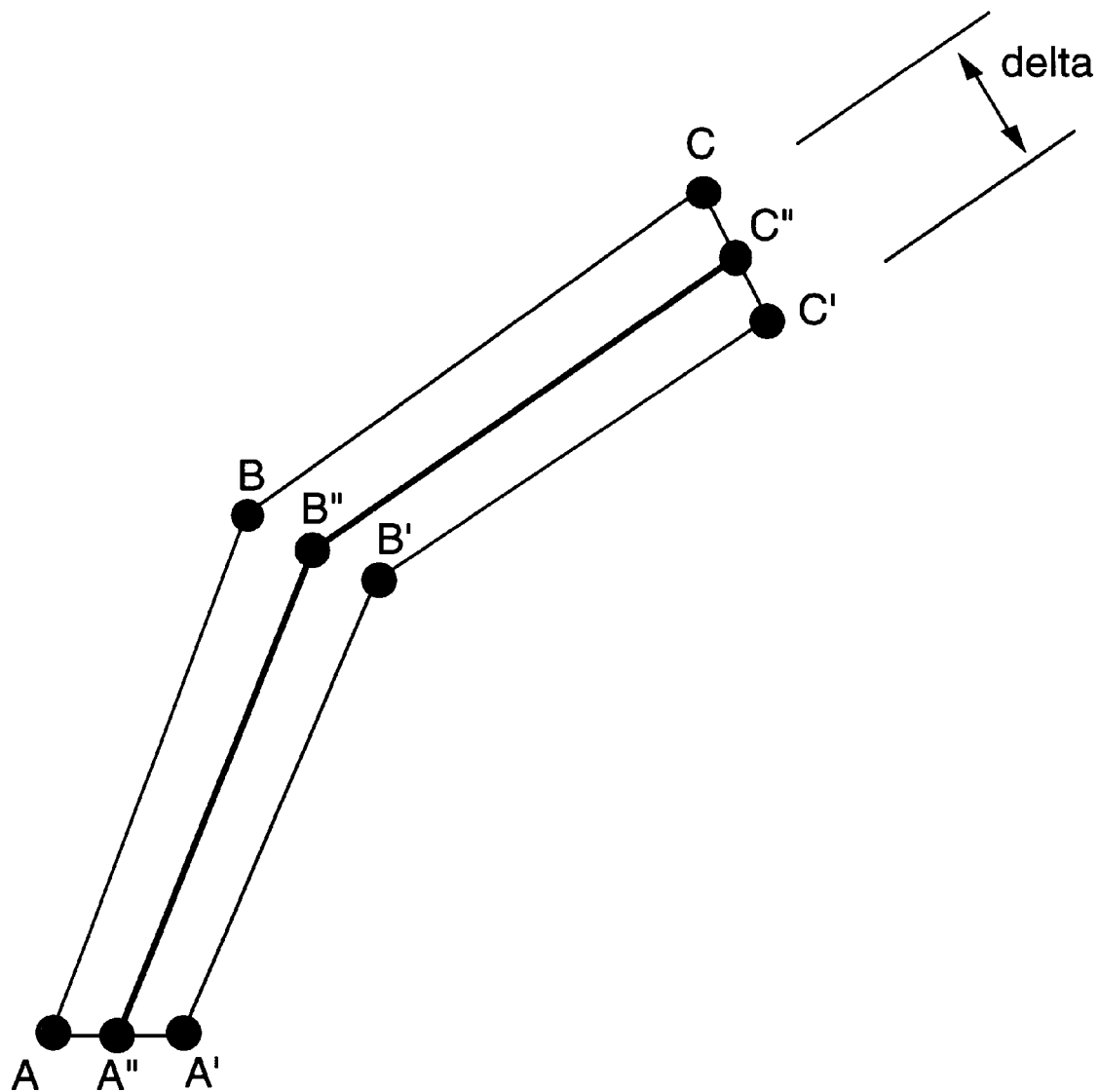
FIG. 12a is a picture illustrating a degenerate stroke.

The regeneration process also checks the database for a second type of degenerated stroke, shown in FIG. 12a, namely, a filled contour in the form of an outline of a stroke. These objects are created, for example, by certain printer drivers or bitmap tracing methods, and can be identified by checking if the object is not stroked, if it is filled, and if its sequence of points doubles back on itself. For example, the contour shown in FIG. 12a is defined by a sequence of points A, B, C, C', B', A', where there is a very small distance delta between points A and A', points B and B', and points C and C'. Such an object is considered a degenerated stroke and is replaced by a single regenerated stroke with points A", B", and C", where the stroke is given a thickness corresponding to the mean width delta and where the points A", B", and C" are positioned between A and A', B and B', and C and C', respectively.

Figure 12B:
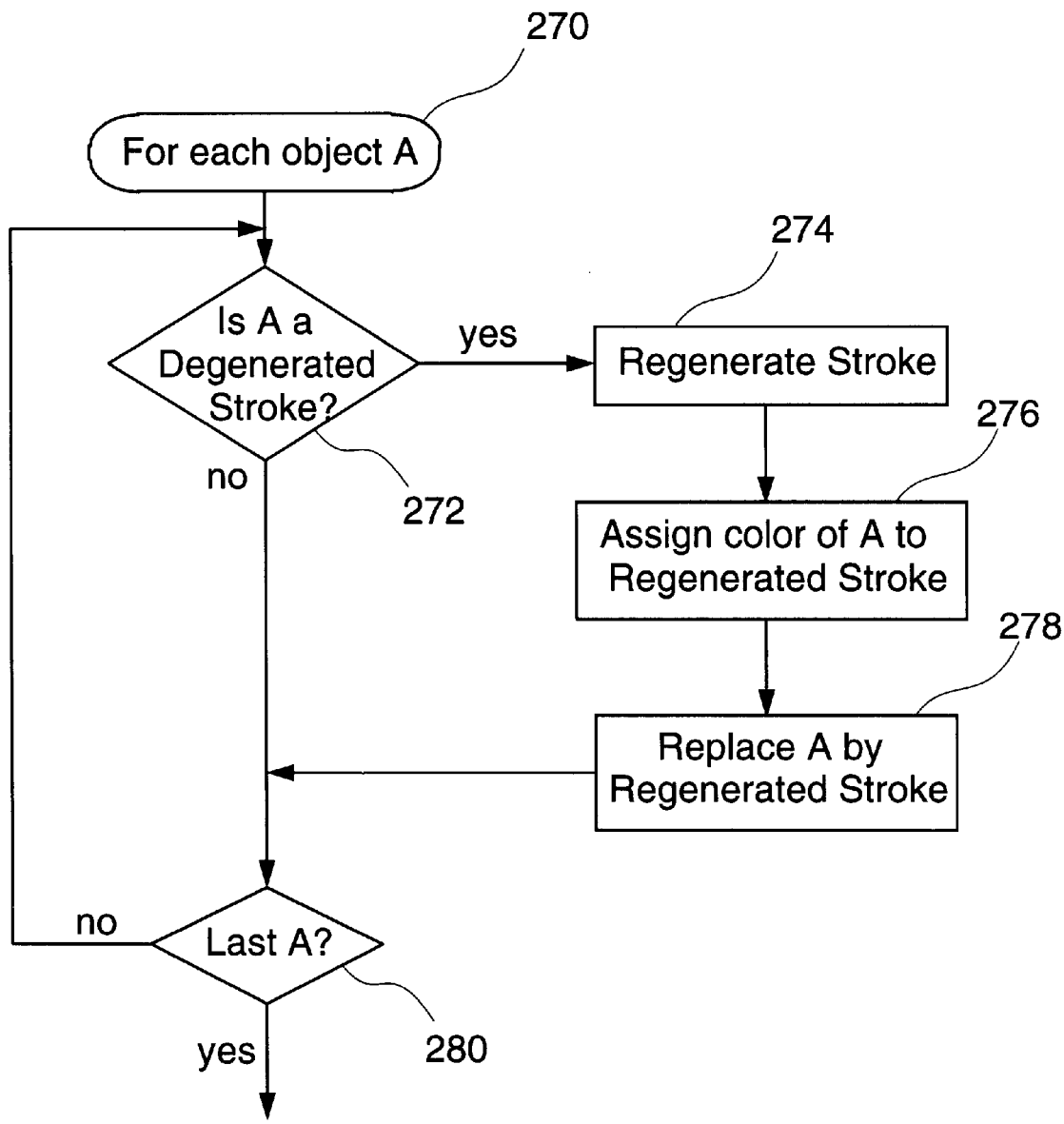
FIG. 12b is a flow chart of the procedure for stroke regeneration.

Regeneration of strokes, illustrated in FIG. 12b, loops through all objects A (blocks 270 and 280). For each A, the program checks if A is a degenerated stroke (block 272), i.e., if it has no surface or if it is the outline of a stroke. If either is the case, the program regenerates the stroke (block 274), assigns the color of A to the regenerated stroke (block 276), and replaces A by the regenerated stroke (block 278).

Separation Merging

When a digital artwork is provided by the artist, it often consists of separate PostScript files, one for each ink. In order to facilitate editing of the original artwork, it is desirable to merge these separations and recreate a single integrated file containing multiple colors. To accomplish this, an object display list is created for each separation and their objects are compared, merged and entered into a new object display list.

Figure 13:
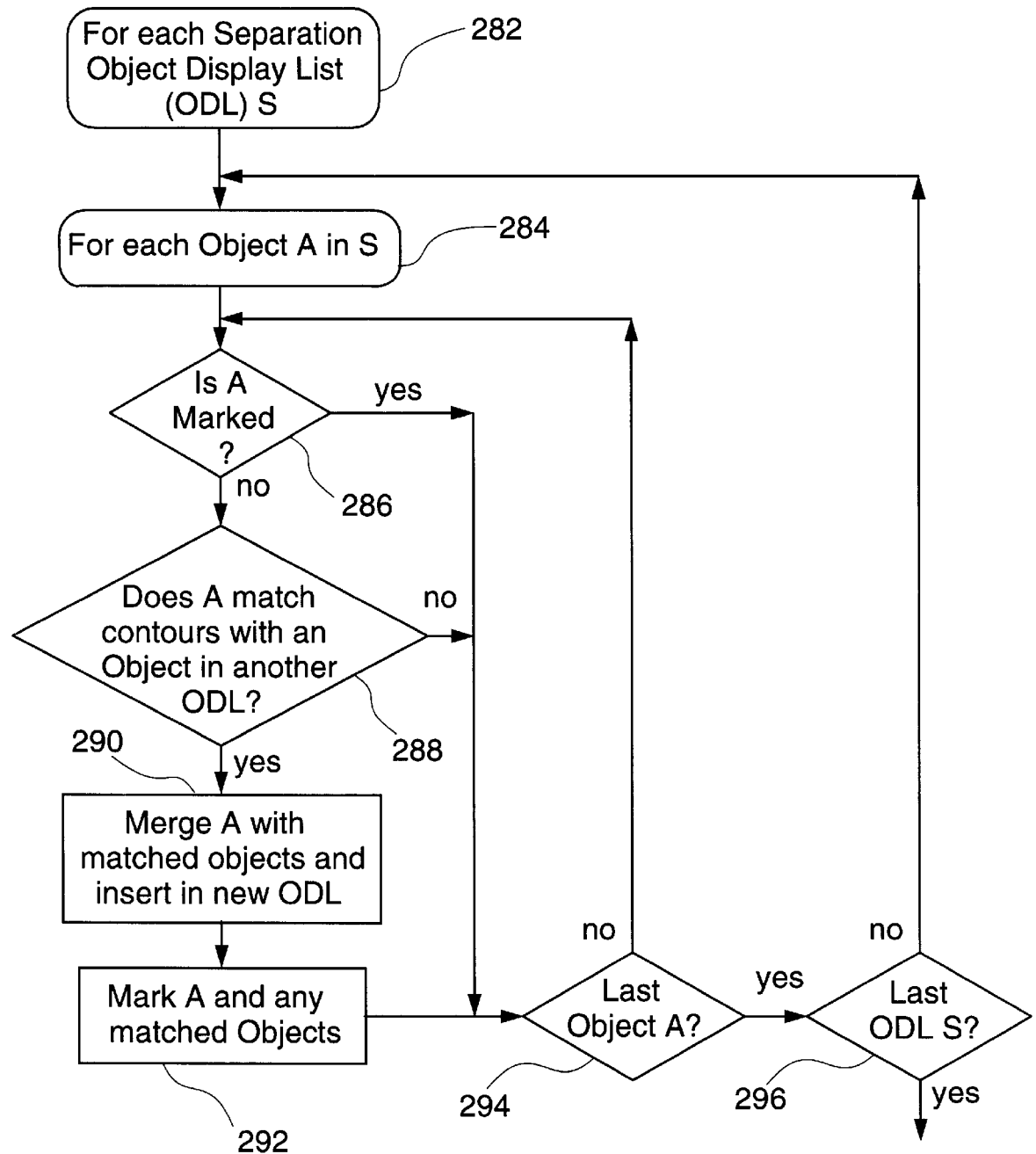
FIG. 13 is a flow chart of the procedure for merging separations.

FIG. 13 shows the method for merging separations. The program loops through each separation S (blocks 282 and 296) and through each object A in the separation S (blocks 284 and 294). Each object A is compared to objects in all the other separations to identify those objects having exactly the same contours (block 288). If a match is found, then A is merged with the matched objects, and inserted into a new ODL (block 290). In particular, if a matched object is present in only one ODL, then it is inserted in the new ODL with the appropriate ink and a transparent paint style. If a matched object is present in all the other ODLs with ink percentages zero, then the object is inserted in the new ODL with the appropriate ink and a solid paint style. If a matched object is found in some of the ODLs with various nonzero percentages then the object is inserted into the new ODL with a color having the appropriate ink components and a transparent ink style. Thus the objects are merged so that the color of the merged object is derived from the color of the matching objects in the separations. When an object or matching objects have been thus merged, they are marked (block 292) so that the comparison (block 286) can preclude the unnecessary comparison for objects that already have been merged. In a preferred embodiment, objects that have been merged are marked to optimize the merging process. After the new ODL is complete, the objects are sorted so that their order corresponds with the order of objects in the separations. The resulting ODL is a reintegration of the separated files and can then be edited as a single file.

All of the above described operations for identifying properties of the graphical objects can be executed individually with user interactivity. Alternatively, they can all be executed after the user has defined various relevant parameters. Similarly, the modification step may be performed manually under the control of a user as well as automatically. The preferred embodiment, for example, may identify objects having predefined properties and select or highlight those objects. Upon the user's discretion or choice, the highlighted or selected objects may then be modified or deleted collectively or individually under the direct control of the user. Alternatively, they may be modified or deleted automatically without the user's intervention.

Having thus described the preferred embodiment in sufficient detail and completeness to enable anyone of ordinary skill in the art to make and use the invention, it will be evident to such a person that many specifics of the foregoing description may be changed to implement the same invention in equivalent ways to produce equivalent results. Accordingly, the scope of the invention is to be determined by the following claims and their legal equivalents.

What is claimed is:

1. In a digital computer a method of processing an original plurality of page description language commands representing a plurality of graphical objects, the method producing a modified plurality of page description commands, the method comprising:

translating the page description language commands into an object display list containing properties of the graphical objects;

identifying in the object display list one or more particular graphical objects having a property matching a predefined property; and producing a modified plurality of page description commands wherein the predefined property is not present, the producing by modifying a subset of the page description language commands corresponding to the particular graphical objects, the modified plurality of page description commands generating an output visually substantially indistinguishable from the output generated by the original plurality of page description commands and representing at most the same number of objects as does the original plurality of page description commands.

2. The method of claim 1 wherein the modified plurality of page description commands is less complex than the original plurality of page description commands.

3. The method of claim 1 wherein the modifying includes changing at least one attribute of some of the particular graphical objects.

4. The method of claim 3 wherein the predefined property comprises having a color and the modifying step comprises changing the subset of the page description language commands so that the color is defined in terms of another color.

5. The method of claim 2 wherein the modifying includes removing one or more objects.

6. The method of claim 5 wherein the predefined property comprises one of the particular graphical objects being hidden behind another graphical object.

7. The method of claim 6 wherein the modifying step comprises deleting the subset of the page description language commands corresponding to the hidden particular graphical object.

8. The method of claim 6 wherein the identifying step comprises searching the object display list for objects that are completely covered by a solid object.

9. The method of claim 8 wherein the solid object is rectangular and has a surface area of at least 150 square mm.

10. The method of claim 5 wherein the predefined property comprises the property of being a spurious contour and the modifying step comprises deleting the subset of the page description language commands corresponding to the particular graphical objects.

11. The method of claim 5 wherein the predefined property comprises one of the particular objects being a clipping part that does not clip any other of the graphical objects and the modifying step comprises deleting the subset of the page description language commands corresponding to the clipping part.

12. The method of claim 2 wherein the modifying includes replacing a subset of the page description language commands corresponding to the particular graphical objects with modified page description commands of one or more modified objects.

13. The method of claim 12 wherein the predefined property comprises the property of being a blend and the modifying step comprises changing the subset of the page description language commands so that each particular graphical object having the predefined property is deleted and replaced by a continuous tone object representing the blend of the particular graphical object.

14. The method of claim 12 wherein the predefined property comprises having a color produced using a predefined ink and the modifying step comprises changing the subset of the page description language commands so that the predefined ink is defined in terms of another ink such that an ink list is reduced in size.

15. The method of claim 14 further comprising creating from the object display list an ink list comprising a complete set of inks sufficient to produce all colors of objects in the object list.

16. The method of claim 12 wherein the predefined property comprises tie property of being a stroke near a border of a continuous tone object and the modifying step comprises changing the subset of the page description language commands so that the border is positioned at the center of the stroke.

17. The method of claim 12 wherein the predefined property comprises having exactly the same contour as a corresponding object and the modifying step comprises changing the subset of the page description language commands so that each particular graphical object is merged with its corresponding object, wherein a color of the merged object is derived from a color of the particular graphical object and a color of its corresponding object.

18. The method of claim 12 wherein the predefined property comprises having a set of control points identical to a second set of control points of a corresponding second object and the modifying step comprises changing the subset of the page description language commands so that each particular graphical object is merged with its corresponding second object to form a single object with multiple attributes.

19. The method of claim 18 wherein the particular graphical object has a fill attribute and the corresponding second object has a stroke attribute.

20. The method of claim 12 wherein the predefined property comprises having a color and the modifying step comprises changing the subset of the page description language commands so that the color is defined in terms of another color.

21. The method of claim 20 wherein the color is a tint of the other color.

22. The method of claim 20 wherein the color is defined in terms of two other colors.

23. The method of claim 12 wherein the predefined property comprises one of the particular graphical objects being a filled contour in the form of an outline of a stroke and the modifying step comprises changing the subset of the page description language commands so that the particular graphical object is replaced by a single stroke object whose thickness corresponds to a mean width of the filled contour.

24. In a digital computer a method of processing an original plurality of page description language commands representing a plurality of graphical objects, the method producing a modified plurality of page description commands, the method comprising:

translating the page description language commands into an object display list containing properties of the graphical objects;

identifying in the object display list one or more particular graphical objects having a property matching a predefined property; and producing a modified plurality of page description commands wherein the predefined property is not present, the producing by changing the stroke attribute of a subset of the page description language commands corresponding to the particular graphical objects, the modified plurality of page description commands generating an output which is more printable than the output generated by the original plurality of page description commands and representing at most the same number of objects as does the original plurality of page description commands.

25. The method of claim 24 wherein the predefined property comprises having a nonprintable thickness and the modifying step comprises changing the subset of the page description language commands so that the particular graphical objects have a printable thickness.

26. In a digital computer a method of processing an original plurality of page description language commands representing a plurality of graphical objects, the method producing a modified plurality of page description commands, the method comprising:

translating the page description language commands into an object display list containing properties of the graphical objects;

identifying in the object display list one or more particular graphical objects having a property matching a predefined property; and producing a modified plurality of page description commands wherein the predefined property is not present by replacing a subset of the page description language commands representing the particular graphical objects, the replacing being with modified page description commands representing at most the same number of graphical objects as the one or more particular graphical objects, the modified plurality of page description commands producing an output which is more printable than the output produced by the original plurality of page description commands.

* * * * *